United States Patent [19]
Schmid

[11] Patent Number: 4,506,566
[45] Date of Patent: Mar. 26, 1985

[54] CABLE FINISHING APPARATUS

[75] Inventor: Hans Schmid, Rüschlikon, Switzerland

[73] Assignee: Megomat AG, Rüschlikon, Switzerland

[21] Appl. No.: 555,640

[22] Filed: Nov. 28, 1983

[30] Foreign Application Priority Data

Dec. 3, 1982 [CH] Switzerland ........................ 7044/82

[51] Int. Cl.[3] .............................................. H02G 1/12

[52] U.S. Cl. .................................. 81/9.51; 29/33 M; 29/564.4; 29/759

[58] Field of Search .................. 81/9.5 R, 9.5 A, 9.51; 29/753, 754, 759, 564.4, 33 M

[56] References Cited

U.S. PATENT DOCUMENTS

| | | | |
|---|---|---|---|
| 2,934,982 | 5/1960 | Eubanks | 81/9.51 |
| 3,604,291 | 9/1971 | Weidner | 81/9.51 |
| 3,638,517 | 2/1972 | Averbuch | 81/9.51 |
| 4,181,047 | 1/1980 | Bitting et al. | 81/9.51 |
| 4,275,619 | 6/1981 | Shimizu | 29/33 M |

*Primary Examiner*—James L. Jones, Jr.
*Attorney, Agent, or Firm*—Werner W. Kleeman

[57] ABSTRACT

Arranged along a cable path of travel is a first cable guide, a pair of retractable transport rolls, a second cable guide, and a cable gripper unit possessing actuatable grippers. The gripper unit is pivotable throughout a predetermined pivot angle about a pivot axis arranged perpendicular to the cable path of travel and into a cable fitting or processing position. There is also provided a cutter unit. All of these components are arranged in succession in the feed or travel direction of the cable as it moves along the cable path of travel. The pivot axis of the gripper unit is arranged between the end of the first cable guide and the clamping point or nip of the pair of transport rolls. The cable fitting or processing position encloses with the cable path of travel an angle of approximately 90°. The pivot axis piercingly extends through the cable path of travel. The drive arrangement for the gripper unit contains a control for controlling the velocity of movement of the gripper unit throughout the pivot angle thereof, so that such travels with an approximately sinusoidal velocity.

6 Claims, 4 Drawing Figures

CABLE FINISHING APPARATUS

BACKGROUND OF THE INVENTION

The present invention relates to a new and improved cable finishing apparatus or machine.

Generally speaking, the cable finishing apparatus or machine of the present development is of the type comprising a first cable guide arranged along a cable path of travel or pathway, a pair of transport rolls arranged following the first cable guide along the cable path of travel, and a second cable guide as well as a cable gripper unit possessing actuatable grippers or gripper elements. The gripper unit can be pivoted about an axis into a cable finishing or processing position, the pivot axis for the gripper unit being arranged essentially perpendicular to the cable path of travel. Furthermore, there is provided a cutter unit or device which is arranged along the cable path of travel following the grippers of the cable gripper unit.

Cable finishing machines, among other things, serve for the automatic fabrication of cable sections or lengths which are freed or bared of insulation at their ends and equipped with a cable socket, connector lug, cable shoe or the like. The cable shoe press, which automatically infeeds cable shoes or the like, mounts such at the wire end of the cable freed of the electrical insulation and presses such into operative connection therewith. This cable shoe press is arranged externally of the cable path of travel. In order to be able to bring the end of the cable which is bared of the electrical insulation into the so-called fitting or processing position by means of the cable gripper unit, it is necessary to bend the cable out of its cable path of travel. On the other hand, the cable equipped with the cable shoe or the like must be further transported along the cable path of travel. Due to the bending or flexing of the cable there frequently is formed thereat a permanent kink or bend which hinders the further transport of the cable and which can lead to disturbances in the automatic operation of the cable finishing machine. This danger becomes increasingly greater as the cable is subjected to greater bending actions, in order to be able to place the end of the cable freed of the insulation into the fitting position. On the other hand, it is desirable to arrange the cable shoe press, for reasons of providing unobstructed access thereto, as far as possible from the cable path of travel. With a given pivot radius of the gripper unit this spacing becomes that much greater the closer that the angle enclosed between the fitting or processing position and the cable path of travel approaches 90°.

SUMMARY OF THE INVENTION

Therefore, with the foregoing in mind it is a primary object of the present invention to provide a new and improved construction of cable finishing machine which is not afflicted with the aforementioned drawbacks and limitations.

Another and more specific object of the present invention is directed to a new and improved construction of cable finishing apparatus or machine which enables bending of the cable into a fitting or processing position through a large pivot angle.

Still a further significant object of the present invention is concerned with a new and improved construction of cable finishing machine which is relatively simple in design, extremely reliable in operation, not readily subject to breakdown or malfunction, provides for a protective processing of the cables, and requires very little maintenance and servicing.

Now in order to implement these and still further objects of the invention, which will become more readily apparent as the description proceedes, the cable finishing apparatus or machine of the present development is manifested by the features that the pivot axis of the gripper unit extends between an end of the first cable guide and the nip or clamping point of the pair of transport rolls, and at least one of the pair of transport rolls can be retracted away from and extended towards the cable path of travel.

Due to the aforementioned measures there is available for the formation of the arc or bent portion in the cable also that cable section which normally is located between the pair of transport rolls or rollers. On the other hand, the unguided length of the cable section which emanates from the transport rolls and which is further transported by a pushing action, does not experience any enlargement notwithstanding the large bending radius.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
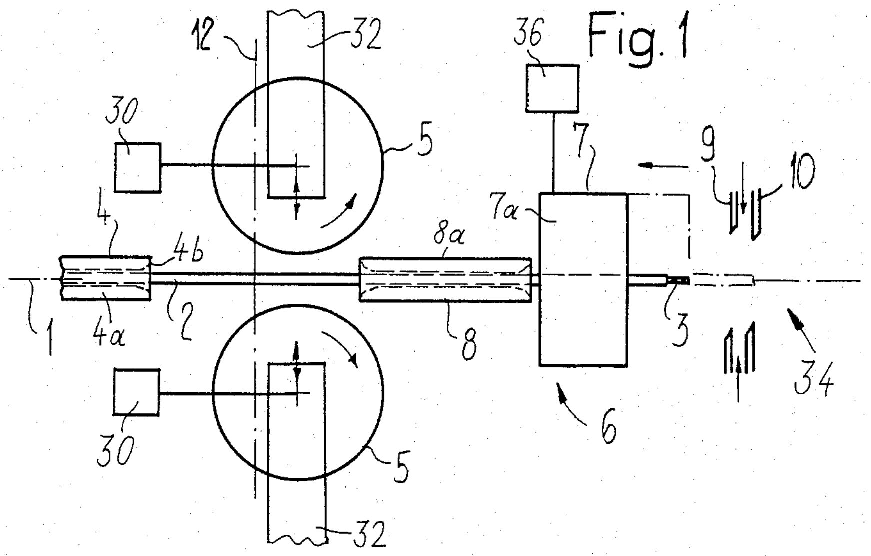
FIG. 1 is a schematic illustration in elevational view of part of the cable finishing apparatus or machine constructed according the invention.
Figure 2:
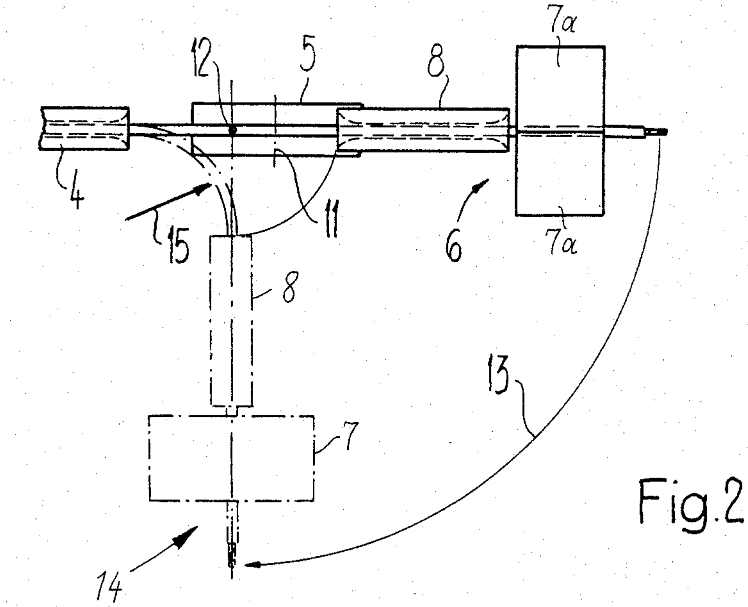
FIG. 2 illustrates a top plan view of the cable finishing apparatus depicted in FIG. 1.

Describing now the drawings, it is to be understood that only enough of the construction of the cable finishing apparatus or machine has been depicted therein as needed for those skilled in the art to readily understand the underlying principles and concepts of the present development while simplifying the illustration of the drawings. Turning attention now to FIGS. 1 and 2, there has been depicted therein a cable path of travel or pathway 1 which extends through the cable finishing apparatus or machine. Arranged along the cable path of travel or pathway 1 are the operating systems or components of the cable finishing apparatus. It will be observed that a cable 2, containing a cable end 3 from which there has been bared or removed the electrical insulation, extends through the cable path of travel 1 and is retained in such path of travel by means of a first cable guide or guide device 4 constituted by a tube-like sleeve 4*a* having an outfeed or delivery end 4*b*. Viewed in the direction of transport or travel of the cable 2 there follows at the first cable guide or guide device 4 a pair of displaceable transport rolls or rollers 5 which can be continuously driven by any suitable drive, as the same has been merely schematically indicated by reference character 30 in FIG. 1. Moreover, in such FIG. 1 these transport rolls 5 have been shown, with respect to the cable path of travel 1, retracted to both sides thereof. These transport rolls 5 can be retracted away from and again moved towards the cable path of travel 1 by means of any suitable guide devices or guides 32.

Continuing, it will be observed that a cable gripper unit or device, generally indicated by reference numeral 6, follows the pair of transport rolls 5 in the direction of movement of the cable 2. This gripper unit or device 6 comprises an axially moveable gripper or gripper structure 7 composed of the gripper jaws or elements 7*a* which can be moved towards and away from one another in order to clamp therebetween the cable 2 or the like and to release the same at the appropriate time. Additionally, in order to axially displace the gripper structure 7 composed of the pair of gripper elements 7*a* and specifically to retract the same away from the cutters 9 and 10 of a conventional cutter device, generally indicated by reference numeral 34, during such time as the electrical insulation is to be removed from the cable end, such as the cable end 3 shown in the arrangement of FIG. 1, there is provided a suitable drive 36. Additionally, there is also provided a second cable guide or guide device 8 which, similar to the first cable guide 4, likewise contains a tube-like sleeve member or sleeve 8*a*. By further referring to FIG. 2 it will be observed that the pairwise arranged cutters or knives 9 and 10 of the cutter unit or device 34, which serve to cut the cable and to remove the electrical insulation therefrom, have been shown in their retracted position.

In accordance with the invention, in the illustrated exemplary embodiment the cable gripper unit 6 is pivotably mounted for pivotable movement about a pivot axis 12 which piercingly extends perpendicular to and through the cable path of travel 1, as best seen by referring to FIGS. 1 and 2. This pivot axis 12 extends between the cable outfeed end 4*b* of the sleeve or sleeve member 4*a* of the first cable guide 4 and a nip or clamping location 11 of the transport rolls 5 and which has been particularly indicated in FIG. 2. The cable gripper unit or device 6 is thus pivotable through a pivot angle 13 into a fitting or processing position 14 (FIG. 2), and this pivot angle, in the illustrated exemplary embodiment, amounts to approximately 90°. At the finishing position 14 there is operatively associated any suitable and therefore not particularly illustrated but conventional cable shoe press or the like by means of which there can be placed onto the cable end 3, which is freed of the electrical insulation, a cable shoe or equivalent structure and such then pressed firmly into contact with and anchored to such exposed cable end 3. Due to the positioning of the pivot axis 12 forwardly or upstream of the clamping point or nip 11 and by virtue of the retractable arrangement of the transport rolls 5, it is possible for the cable section or portion which is located between these transport rolls 5 to participate in the bending of the cable and in the formation of an arc having a bending radius 15 (FIG. 2) which is thus comparatively large. Accordingly, there is not present any danger of kinking or otherwise undesirably flexing the cable 2. Following the return of the cable gripper unit or device 6 from the phantom line depicted finishing position of FIG. 2 into the full line illustrated starting position located along the cable path of travel 1 it is possible to further transport the thus processed cable 2 without any difficulties.

Instead of designing both transport rolls 5 so as to be retractable, it also would be possible to accomplish release of the cable by means of a single retractable transport roll or roller.

The invention also enables reducing the times which are needed in order to pivot or rock the cable gripper unit 6 between both of the end or terminal positions depicted in FIG. 2 in phantom and full lines, respectively. In terms of fabricating finished cables such times constitute unproductive or dead-times. With a constant angular velocity of the pivotal movement there would have to be reckoned with a prolongation of the dead-time if, as has been illustrated in the exemplary embodiment, the finishing location is arranged at an angle of 90° with respect to the cable path of travel or pathway 1. The solution of this objective is accomplished in that the drive of the gripper unit 6 is provided with a control which controls the velocity of movement of the pivotable gripper unit 6 throughout its pivot angle 13, as will now be described with reference to FIGS. 3 and 4.

Figures 3, 4:
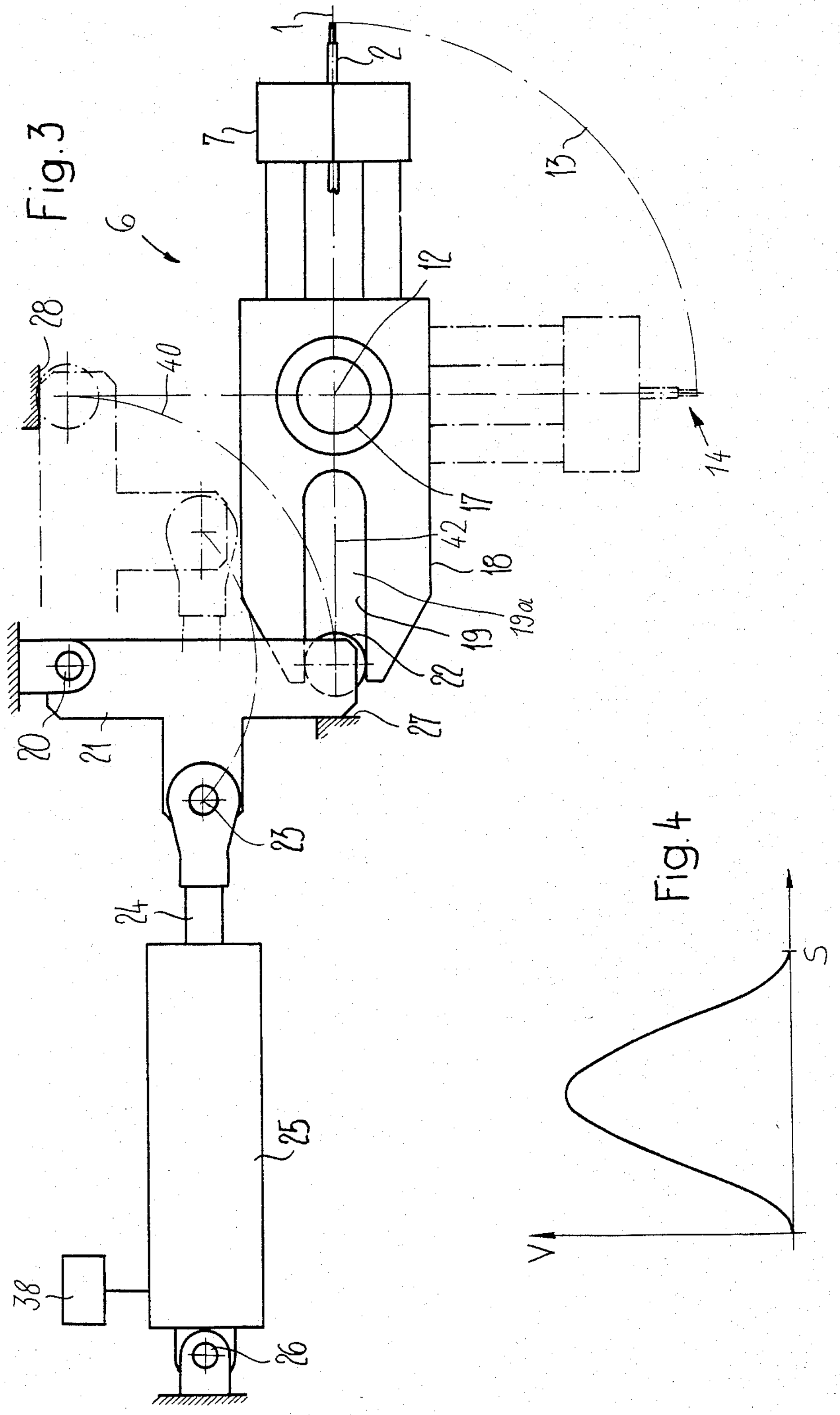
FIG. 3 is an enlarged top plan view of the cable gripper unit and its related drive arrangement as employed in the cable finishing machine depicted in FIGS. 1 and 2.
FIG. 4 is a graph depicting the velocity of the gripper unit throughout its pivot angle.

In the exemplary embodiment of the drive for the cable gripper unit 6, as depicted in FIG. 3, such is mounted to be pivotable about a pivot pin or shaft 17, the axis of which coincides with the pivot axis 12. Pivotably mounted upon the pivot pin 17 is a support 18 which carries both the gripper structure 7 composed of the pair of gripper elements 7*a* as well as also the second cable guide or guide device 8, which has not been particularly depicted in FIG. 3. At the side of the support 18 which is located opposite to the pivot axis 12 this support or support member 18 is provided with a cam structure or section 19, here shown in the form of a substantially linear groove or slot 19*a*. A lever member 21, which is pivotable about a pivot pin 20, engages by means of a roller 22 constituting a cam follower in the cam structure or section 19. At the lever or lever member 21 there engages at the hinge connection location 23 the piston rod 24 of a piston-and-cylinder unit 25 which, in turn, is pivotably mounted at pivot location 26.

Upon actuation of the gripper drive constituted by the piston-and-cylinder unit 25 with any suitable pressurized fluid medium, for instance compressed air, the lever member 21 is pivoted by the piston rod 24 out of its full-line depicted starting position, where it bears against or contacts a stop or impact member 27, until such lever member 21 is ultimately stopped by impacting against a second stop or impact member 28, as shown for the position of the lever member 21 depicted in phantom lines in FIG. 3. The position of the second stop or impact member 28 is selected such that due to the engagement of the cam follower or roll 22 in the slot-like cam structure 19 the support 18 is pivoted through an angle of approximately 90°. This angle corresponds to the lowering angle of the lever member 21 as it moves between the first stop or impact member 27 and the second stop or impact member 28. The gripper unit 6 is then located in the fitting or processing position 14, shown in phantom lines in FIGS. 2 and 3. A renewed actuation of the piston-and-cylinder unit 25 in the sense of retracting or inwardly thrusting the piston rod 24 accordingly causes a pivoting of the cable gripper unit 6 back into the starting position where such gripper unit 6 is located along the cable path of travel 1. During this operation the lever member 21 impacts against the stop or impact member 27. During such time as the cable gripper unit 6 moves between the two possible end or terminal positions thereof, defined by the movement of the lever member 21 between its two terminal positions where the same abuts against the respective stop or impact members 27 and 28, it will be seen that the roll or roller 22 and equally the lever member 21 move along a circular arc or curved travel path 40. In the one terminal position where the lever member 21 abuts against the stop or impact member 27 the lengthwise extending axis 42 of the cam structure 19 extends approximately tangentially to this circular arc 40 described by the pivotal movement of the lever member 21 and such lengthwise extending axis 42 of the cam structure 19 likewise extends approximately tangentially to such circular arc 40 when the lever member 21 assumes the other phantom line end position of FIG. 3.

From the illustration of FIGS. 3 and 4 it will be understood that pivoting of the lever member 21 out of its full-line depicted starting position only gradually causes a pivoting of the support or support member 18. The lever member 21 has an increasing effect upon the position of the support member 28 the more pronounced the pivotal movement of such lever member 21 approaches an angle of 45° in relation to its starting position. However, if the lever member 21 exceeds a pivot angle of 45° and approaches the second stop or impact member 28, then its effect upon the position of the support member 18 again decreases. It should be mentioned that the piston rod 24, upon actuation of the piston-and-cylinder unit 26, apart from the starting acceleration moves with approximately constant velocity, and this velocity course or pattern is identically transmitted to the course or pattern of the angular velocity of the lever member 21. Due to the arrangement and extent of the linear cam structure 19 constituted by the slot or recess 19*a*, such that its lengthwise axis 29 pierces the pivot axis 12 and encloses with the lever member 21 in the one starting or end position as well as in the other end position thereof an angle of approximately 90°, the course of the angular velocity of the gripper unit 6 assumes an approximately sinusoidal configuration as shown in FIG. 4. The movement of the lever member 21, and thus the gripper unit 6, can be accomplished by any suitable control 38 which powers the piston-and-cylinder unit 25, so as to obtain the velocity pattern depicted in FIG. 4, wherein the velocity is plotted along the ordinate and the displacement or travel distance of the gripper unit along the abscissa. Furthermore, it will be observed that the velocity continuously increases starting from a velocity value null until reaching a maximum along the displacement path at the center thereof, i.e. upon reaching one-half of the pivot angle of the gripper unit, and thereafter during the second half of the displacement path continues to continuously decrease, and at the same time with the accomplishment of the full displacement path of the gripper unit 6, i.e. the pivot angle 13 thereof, there is also again attained the velocity value of null. The gripper unit 6 is thus only gradually accelerated and decelerated, as the case may be. An abrupt acceleration and deceleration only is present at the piston rod 24 and the lever member 21, the mass of which is low. At these components there is permissible a high velocity and accordingly a pronounced acceleration and deceleration. It is possible to move within a very short time interval through the pivot angle 13 of the gripper unit 6 even if the size thereof is increased and independent of the mass of the gripper unit, and accordingly, it is equally possible to maintain extremely brief the corresponding dead-time.

While there are shown and described present preferred embodiments of the invention, it is to be distinctly understood that the invention is not limited thereto, but may be otherwise variously embodied and practiced within the scope of the following claims. Accordingly,

What I claim is:

1. A cable finishing apparatus comprising:

a first cable guide arranged along a predetermined cable path of travel along which a cable moves in a predetermined travel direction;

a pair of transport rolls arranged following the first cable guide in the predetermined direction of travel of the cable;

a gripper unit equipped with a pair of actuatable cable gripper elements arranged following the pair of transport rollers;

a second cable guide cooperating with said gripper unit;

means for mounting said gripper unit to be pivotable into a cable finishing position about a pivot axis arranged substantially at right angles to said cable path of travel;

a cable cutter unit arranged along the cable path of travel following said gripper unit;

said pair of transport rolls defining therebetween a nip;

said pivot axis of the gripper unit being located between an end of the first cable guide and said nip of said pair of transport rolls; and means for enabling retraction of at least one of said transport rolls away from said cable path of travel.

2. The cable finishing apparatus as defined in claim 1, wherein:

each of said first and second cable guides comprises a respective tube-like sleeve member; and means for enabling retraction of both of said transport rolls away from and to opposite sides of said cable path of travel.

3. The cable finishing apparatus as defined in claim 2, wherein:

said cable finishing position encloses an angle of approximately 90° with the cable path of travel; and said pivot axis of the gripper unit piercingly extends through said cable path of travel.

4. The cable finishing apparatus as defined in claim 1, wherein:

said cable finishing position encloses an angle of approximately 90° with the cable path of travel;

said pivot axis of the gripper unit piercingly extends through said cable path of travel.

5. The cable finishing apparatus as defined in claim 1, further including:

drive means including control means for controlling the velocity of movement of the gripper unit throughout a predetermined pivot angle thereof.

6. The cable finishing machine as defined in claim 5, wherein:

said gripper unit is provided with a substantially linear cam structure;

said drive means for said gripper unit comprises a piston-and-cylinder unit;

said drive means further comprising a lever member driven by said piston-and-cylinder unit and engaging with said linear cam structure;

two stop members between which said lever member is pivotable between respective first and second end positions;

said linear cam structure having a lengthwise extending axis which piercingly extends through said pivot axis; and said lengthwise extending axis of said cam structure extends approximately tangentially to a circular arc described by said lever member when moving between said first and second end positions.

* * * * *